United States Patent
Andersson

(10) Patent No.: US 6,750,923 B1
(45) Date of Patent: Jun. 15, 2004

(54) DISPLAY DEVICE

(75) Inventor: Lars Andersson, Bromma (SE)

(73) Assignee: TDS Displays AB, Stockholm (SE)

( * ) Notice: Subject to any disclaimer, the term of this patent is extended or adjusted under 35 U.S.C. 154(b) by 0 days.

(21) Appl. No.: 09/529,401

(22) PCT Filed: Oct. 21, 1998

(86) PCT No.: PCT/SE98/01906

§ 371 (c)(1), (2), (4) Date: Apr. 19, 2000

(87) PCT Pub. No.: WO99/21049

PCT Pub. Date: Apr. 29, 1999

(30) Foreign Application Priority Data

Oct. 22, 1997 (SE) .............................................. 9703851

(51) Int. Cl.[7] ........................... G02F 1/133; G09G 3/34; G08B 21/00; G02B 27/10; G02B 27/14
(52) U.S. Cl. ........................ 349/20; 349/183; 349/199; 345/106; 340/636.14; 359/620; 359/634
(58) Field of Search ..................... 349/20, 183, 199, 349/161, 72; 345/106; 340/636.14; 359/620, 634

(56) References Cited

U.S. PATENT DOCUMENTS

| | | | |
|---|---|---|---|
| 4,142,782 A | * | 3/1979 | O'Brian ..................... 359/288 |
| 4,834,500 A | | 5/1989 | Hilsum et al. ............... 350/331 |
| 4,945,919 A | * | 8/1990 | Hattori ........................ 128/736 |
| 5,124,819 A | | 6/1992 | Davis .......................... 359/53 |
| 5,202,677 A | | 4/1993 | Parker et al. ................ 340/786 |
| 5,283,290 A | * | 2/1994 | Jung et al. .................. 525/111 |
| 6,017,594 A | * | 1/2000 | Sheets ............................ 428/1 |

FOREIGN PATENT DOCUMENTS

GB 2199981 7/1988

* cited by examiner

Primary Examiner—Robert H. Kim
Assistant Examiner—Hoan Nguyen
(74) Attorney, Agent, or Firm—Jacobson Holman PLLC

(57) ABSTRACT

A known display device consists of a sheet-like support which is covered with liquid thermocromic crystals. The crystals are tempered by individual power supply to individual heatable elements, which lie close to the crystals and are placed between the sheet-like support and the crystals. The crystals assume different shades of color dependent on the given temperature so that hereby the color of the crystals will form a certain pattern. In order to improve the possibilities to control the tempering of the individual crystals and also protect them from being effected by the ambient temperature and from mechanical damage, the crystals have an underlying arrangement which is controlled to cool down th crystals and/or keep the sheet-like support of the crystals at a certain temperature. This temperature is lower than the temperature, at which the crystals are colored. Further the crystals are covered by a coating of lacquer over the complete sheet-like support.

5 Claims, 2 Drawing Sheets

DISPLAY DEVICE

FIELD OF THE INVENTION

This invention refers to a display device consisting of a sheet-like support, which is covered with liquid thermocromic crystals, which can be tempered by separate power supply to individual heating element, which lie close to the crystals and are placed between the sheet-like support and the crystals, whereby the crystals assume different shades of colour depending on the given temperature so that hereby the colour of the crystals will form a certain pattern.

BACKGROUND OF THE INVENTION

A display arrangement of now mentioned type is disclosed in e.g. U.S. Pat. No. 4,142,782. This display includes a sheet-like support, which has a surface, which is covered with a thin layer of a conventional paint. The layer is in turn covered with areas of a certain thermocromic composition and it may also contain areas of different thermocromic composition. It may also contain areas of further different kind of a thermocromic composition and/or mixtures of the earlier mentioned thermocromic compositions. The areas will normally be created by conventional painting techniques using a coating composition containing a thermocromic compound and an appropriate conventional binder and an appropriate solvent. The composition may further include pigments of any colour or the composition can be colourless. The binder is usually colourless in order not to obscure the colour effects to be formed. It is further described in the patent that the heating of the different areas is carried out by plate-like electrical resistance elements, which are placed between the sheet-like support and the areas of the thermocromic positions. These plate-like electrical resistance elements heat the individual crystals in the different areas to a certain temperature so that the crystals in a specific area assume a certain colour depending on the temperature. According to the above described methods certain areas or certain points are given a certain colour by that the thermocromic crystals, above or in the neighbourhood of a certain heating element are heated. Different patterns will hereby be formed by that the crystals having a certain colour will form a certain pattern. If the display however is subjected to the ambient temperature, one can understand that it may be difficult to control the pattern so it has the wanted design and it can also be difficult to change the pattern from one design to another if the new pattern demands a lower temperature for the individual crystals than the earlier temperature. The temperature of the sheet-like support is thus of great importance and the sheet-like support may assume the ambient temperature, which can be so high that the control of the temperature for the individual electrical element have no effect on the crystals but it is only the ambient temperature which has an effect on the crystals.

SUMMARY OF THE INVENTION

The object of the invention is to increase the possibilities to control the tempering of the individual crystals and also protect them from being effected by the ambient temperature and also from mechanical damage. The produced picture on the display shall also be possible to program.

The invention is characterized by the features stated in the following patent claims and a favourable embodiment is described in the following by reference to accompanying drawings.

DETAILED DESCRIPTION OF THE PREFERRED EMBODIMENTS

Figure 1:
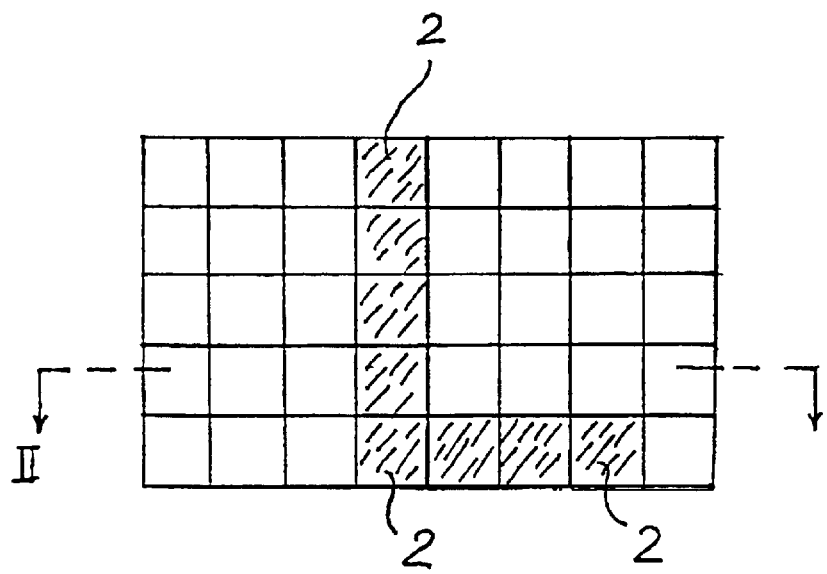
FIG. 1 is thereby a schematic view a display according to the invention.

The invention is thus a display device consisting of a stiff sheet-like support 1. The sheet-like support could be made for instance of metal. Several small separately heatable elements 3 are arranged on the sheet-like support and the heating is performed by supplying an electrical voltage through cables 6 to the elements 3. A layer of liquid thermocromic crystals 2 cover the layer of the heatable elements. The liquid thermocromic crystals may be applied by painting of a coating composition which contains thermocromic crystals, which are bound by a binder. The characteristic of the thermocromic crystals is that they assume a certain colour in correspondence to their given temperature. If thus a heatable element below a crystal is heated to a certain temperature, said crystal will assume said temperature and is coloured if the temperature is higher than the temperature at rest of the crystal. FIG. 1 shows that the crystals 2 have been given a certain temperature so that a letter L has been formed. The letter L appears by that all the crystals along the shape of L have been given the same certain temperature by the underlying heatable element. The thermocromic crystals outside L remain passive because their underlying heatable element have not been heated by voltage supply. As said earlier the power for heating the elements can take place by supplying a current of a certain voltage.

The thermocromic crystals are covered by a coating of lacquer 5 in order to protect the crystals to the surroundings, the composition of said coating of lacquer being stated later.

In order to quickly be able to change the pattern, formed by the crystals, it could be necessary to cool down the crystals, if the crystals must be given a lower temperature than the one they have in order to assume a different colour. This could concern all the crystals or certain crystals. All the crystals shall thus be cooled down and this can be done by that the sheet-like support 1 is cooled down or is kept on a constant temperature which is lower than the temperature which makes the crystals to assume a certain colour. This means that as long as the heatable element are not heated any longer, the whole display device including the thermocromic crystals will be cooled down to the temperature of the sheet-like support.

Figure 3:
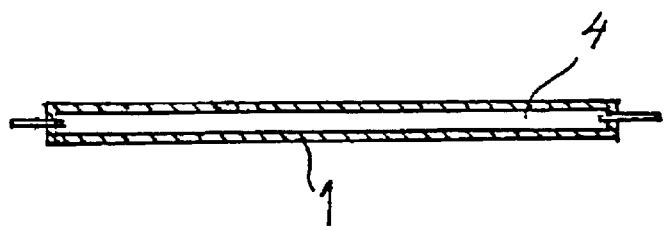
FIG. 3 is a section through the underlying sheet-like support.
Figure 4:
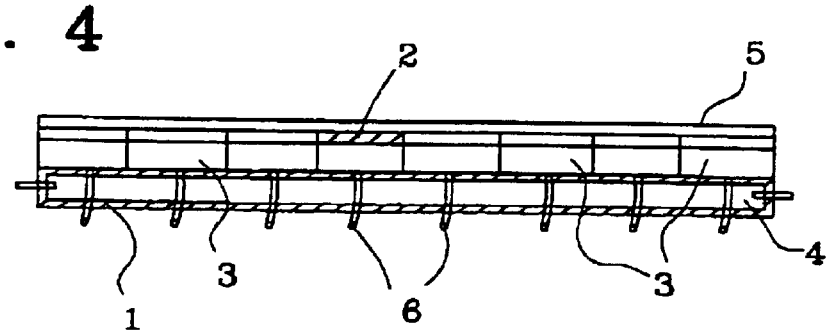
FIG. 4 is a sectional view of the cooling means of FIG. 3 incorporated into the structure of FIG. 2.
Figure 5:
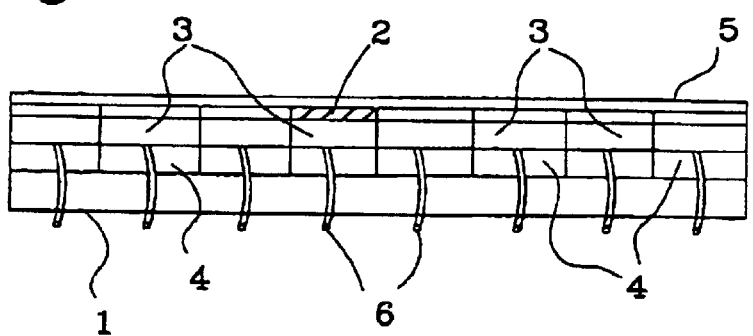
FIG. 5 is a sectional view corresponding to FIG. 2 with a layer of cooling means of FIG. 4 inserted between the heatable elements and the sheet-like support.

This is illustrated in FIG. 3 by that the sheet-like support 1 has one or several continuous channels or is designed like a jacket so that the sheet-like support is hollow whereby a cooling medium 4 can pass through the sheet-like support and keep it at a constant temperature or lower the temperature for the complete display device.

Figure 2:
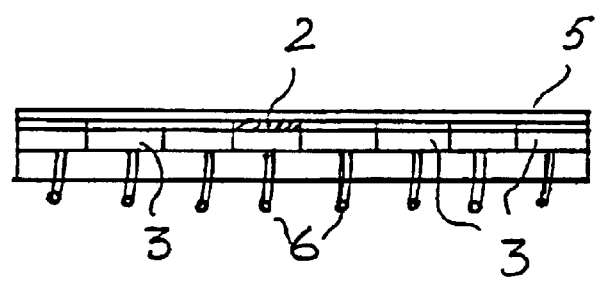
FIG. 2 is a schematic section according to the lines II—II of FIG. 1.

A further way to carry out the refrigerating capacity is to arrange a layer of peltier elements under the heatable elements. The characteristic of a peltier element is that it very quickly is controlled by means of electrical energy and thus can be given an enough low temperature in order to lower the temperature of the thermocromic crystals under the temperature at which they are given a certain colour. The peltier elements can also be used instead of the heatable elements 3, see FIG. 2 whereat thus the heatable elements 3 are peltier elements.

The kind of coating of lacquer which is used consists suitably of an acryl base and synthetic agent and it is specifically suitable that the mixing proportion is 10:1. Such a lacquer is very resistant to wearing and also UV-radiation. The described display device is thus suitable as an advertising sign, because the pattern on the display (figures) can be altered rapidly. The display device is not effected by the ambient temperature because the sheet-like support is kept at a constant temperature. If not, the sunshine could effect the display so that it is not possible to control the pattern which the thermocromic crystals should show. Electrical energy is preferably used, e.g. supply of current of a certain voltage, for heating the heatable elements and the supply of current can be program-controlled concerning the voltage and also which of the heatable elements that should be supplied by power. Thus a computer may be programmed by a certain picture and accordingly controls the signals for the power supply to the heatable elements. The signals of a computer can also be used and possibly amplified in order to bring about the change of the temperature of the underlying means. The computer can also control the refrigeration.

What is claimed is:

1. Display device comprising:
    a sheet-like support covered with a layer of liquid thermocromic crystals, the liquid thermocromic crystals being separately tempered by an individual power supply to individual heatable elements, the individual heatable elements being close to the liquid thermocromic crystals and being placed between the sheet-like support and the liquid thermocromic crystals, the liquid thermocromic crystals assuming different shades of color dependent on a given temperature so that the color of the liquid thermocromic crystals will form a certain pattern and a figure, the liquid thermocromic crystals being distributed over a complete layer without a specific pattern and a design of the figure being determined only by tempering the individual heatable elements located according to said design, and cooling means placed in one of the sheet-like support and between the sheet-support and the liquid thermocromic crystals for controlling cooling down of the liquid thermocromic crystals to a certain temperature lower than the given temperature, the liquid thermocromic crystals being covered by a protective coating.

2. Display device according to claim 1, wherein the individual heatable elements consist of peltier elements supplied by electricity to set their temperature.

3. Display device according to claim 2, wherein the liquid thermocromic crystals are painted on the peltier elements.

4. Display device according to claim 1, wherein the protective coating is a plain lacquer and consists of an acryl base and a synthetic agent.

5. Display device according to claim 1, wherein a mixing proportion between the acryl base and the synthetic agent is 10:1.

* * * * *